(12) United States Patent
Lin

(10) Patent No.: US 7,046,508 B2
(45) Date of Patent: May 16, 2006

(54) PALM-SIZE GAME CASE

(76) Inventor: Chih-Hsiung Lin, PO Box 82-144, Taipei (TW)

( * ) Notice: Subject to any disclaimer, the term of this patent is extended or adjusted under 35 U.S.C. 154(b) by 277 days.

(21) Appl. No.: 10/682,085

(22) Filed: Oct. 10, 2003

(65) Prior Publication Data

US 2005/0078441 A1   Apr. 14, 2005

(51) Int. Cl.
*G06F 1/16* (2006.01)
(52) U.S. Cl. .................. 361/683; 361/679; 361/681; 273/148 B; 273/150; 273/289; 463/46; 463/47
(58) Field of Classification Search ............... 361/600, 361/679, 728, 730, 752, 807, 809, 814, 683; 206/305, 38, 320, 576; 312/223.1, 223.2; 379/433; 220/581, 836, 843, 845, 848, 811, 220/813, 815, 4.22, 4.23; 16/319, 234, 292, 16/317, 297, 223, 235; 174/17.05, 17.06, 174/50.05, 50.51; 273/148 B, 150, 289; 463/46, 47
See application file for complete search history.

(56) References Cited

U.S. PATENT DOCUMENTS

| | | | |
|---|---|---|---|
| 6,239,968 B1 * | 5/2001 | Kim et al. | 361/679 |
| 6,313,982 B1 * | 11/2001 | Hino | 361/679 |
| 6,646,864 B1 * | 11/2003 | Richardson | 361/681 |
| 6,757,161 B1 * | 6/2004 | Lai et al. | 361/683 |
| 6,819,549 B1 * | 11/2004 | Lammers-Meis et al. | 361/681 |

FOREIGN PATENT DOCUMENTS

JP    408046363 A  *  2/1996

* cited by examiner

*Primary Examiner*—Michael Datskovskiy
(74) *Attorney, Agent, or Firm*—Leong C. Lei

(57) ABSTRACT

A compact, easy-to-use and space-saving case for a main unit of a palm-size game that provides the combined functions of a retractable handle, a storage tray, and a protection case, and is essentially comprised of a lower lid and an upper lid with the main unit fixed between; the upper lid is removed and the case can turn 180 degrees in reverse direction while the lower lid serves as the rail and the groove on the upper lid serves as the track to create a drawer type storage tray for accommodating a game cartridge while both lids and the main unit define a retractable trapezoid handle.

3 Claims, 8 Drawing Sheets

PALM-SIZE GAME CASE

BACKGROUND OF THE INVENTION (a) Technical Field of the Invention

The present invention is related to a case adapted to a main unit of a palm-size game that provides combined functions of handle, storage and protection, and more particularly to a retractable, multi-purpose case with a positioning and railing case adapted to a GBAsp.

(b) Description of the Prior Art

Video game development has increased at an astonishing rate and has become an integrated part of family life and personal life thanks to the prosperous development of the information industry. To meet the needs of easy portability, palm-size games are introduced into the market with its storage capacity for interface getting larger, with more compact in operation interface or size, such as the updated GBAsp and PDA.

However, the compact palm-size game is usually made with the added cost of providing comfort in handling. Therefore, a protection case is required that provides an additional handler for comfort while playing without compromising its convenience, and also protection to the main unit of the game. The handle is generally adapted to a GBAsp and is related to a holder which is buckled below the main unit of the game. Both sides of the holder are each externally extended to define arc handles. Though the handle allows for more comfort in holding the game, it is provided at the cost of the easy portability as is expected with a palm-size game.

SUMMARY OF THE INVENTION

The primary purpose of the present invention is to provide a case to the main unit of the game which improves the comfort in holding the game while playing without compromising its portability. To achieve the purpose, both front and rear ends of the main unit of the game are reserved with multiple buckling holes.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
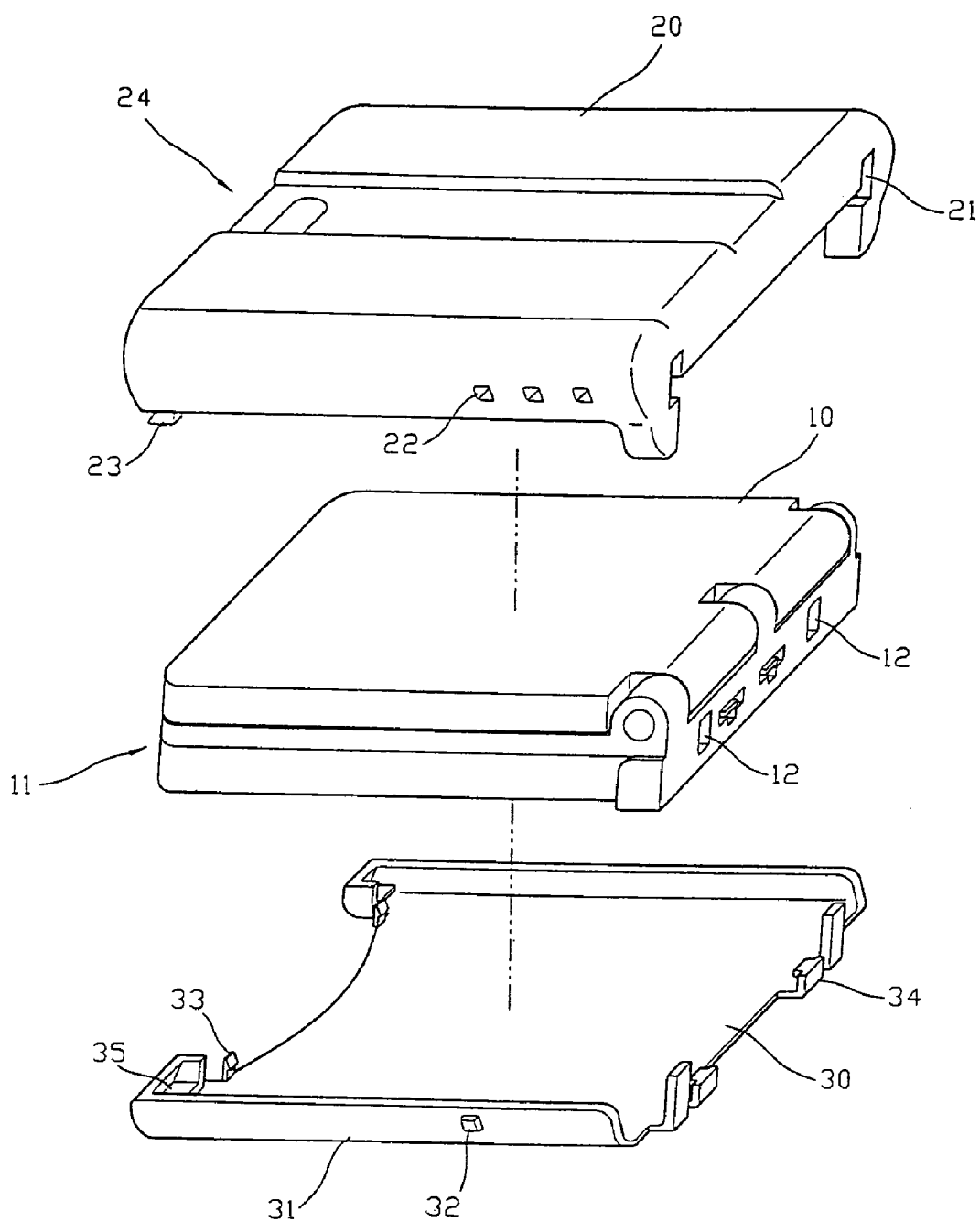
FIG. 1 is an exploded view of a preferred embodiment of the present invention adapted to a main unit of a palm-size game.

Referring to FIG. 1, the present invention related to a case made for a palm-size game's main unit that provides combined functions such as a protection, a handle, and storage tray which is essentially comprised of a lower lid 30 tightly buckled to the base of the main unit 10, and an upper lid 20 connected to the lower lid 30 and buckled to the top of the main unit 10. Wherein, both of the upper and the lower lids 20, 30 are connected to each other to form a case containing the main unit 10 for easy portability and protection. One buckling hole 11 is reserved on both sides of the front of the main unit 10 where a game cartridge is inserted, and one buckling hole 12 i reserved on both sides on the back of the main unit where it is connected to the bus.

The lower lid 30 is made by comprising the contour of the base of the main unit 10, which, both sides form an arc rail 31 in proper proportion to be inserted into track 21, which is recessed on each side of the upper lid 20. A locking catch 32 is reserved on each rail 31 of the lower lid 30, another locking catch 33 in relation to the buckling hole 11 at the front of the main unit is extended from the rounded front edge of the lower lid 30, a trapezoid inclination trough 35 is formed on the side of the locking catch 33 and extends forward into the lower lid 30, and a locking catch 34 extends from the rear of the lower lid 30 in relation to the buckling hole 12 provided at the rear of the main unit 10.

The appearance of the upper lid 20 indicates an arc on both sides and a recessed center that defines an H-shaped handle 24 for holding. The recessed space inside the upper lid 20 provides a storage tray and the track 21 is provided where the side of the upper lid 20 curves downward where it is engaged to its corresponding rail 31 on the lower lid 30 when the upper lid 20 is flipped over to stay below the lower lid 30. Multiple buckling holes 22 are provided on the outer edge of the track 21 on both sides of the upper lid 20; and another two buckling holes 23 in trapezoid are each provided on the front edge of the upper lid to be inserted into its corresponding trough 35 provided at the front edge of the lower lid 30.

Figure 2:
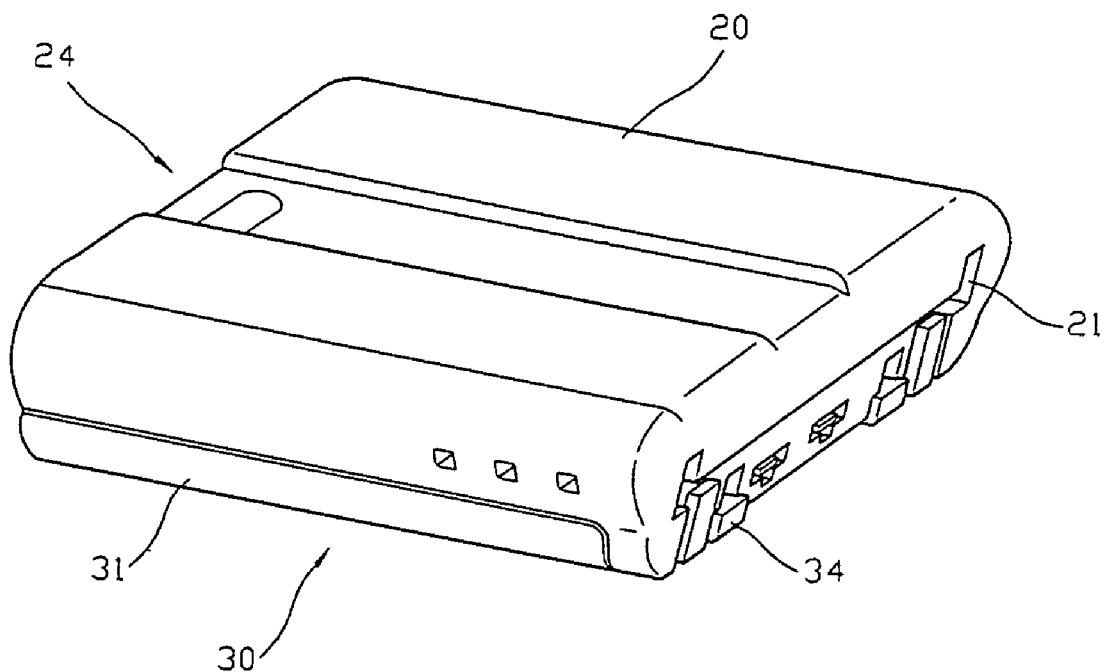
FIG. 2 is a schematic view showing the preferred embodiment is adapted to the main unit of the palm-size game.
Figure 3:
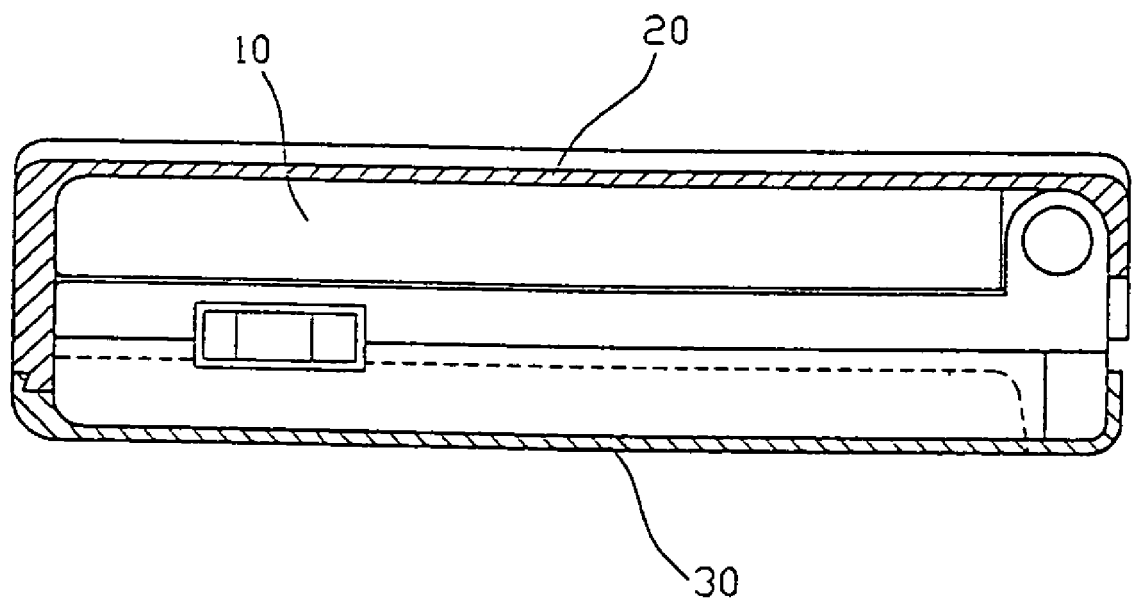
FIG. 3 is a sectional view showing the preferred embodiment is adapted to the main unit of the palm-size game.

Those buckling holes 11, 12 reserved on the front and the rear of the main unit 10 are inserted first by their respective locking catches 33, 34 from the lower lid 30, then those two buckling holes 23 in trapezoid are inserted into their respective troughs 35 in the front of the lower lid 30. Whereas a recess is reserved on the main unit 10 at where its display is close to a pivot end, the recess is clicked to its corresponding nipple fixed to the inner edge of the upper lid 20 for the main unit 10 to be fixed between and protected by both of the upper lid 20 and the lower lid 30 as illustrated in FIGS. 2 and 3.

Figure 4A:
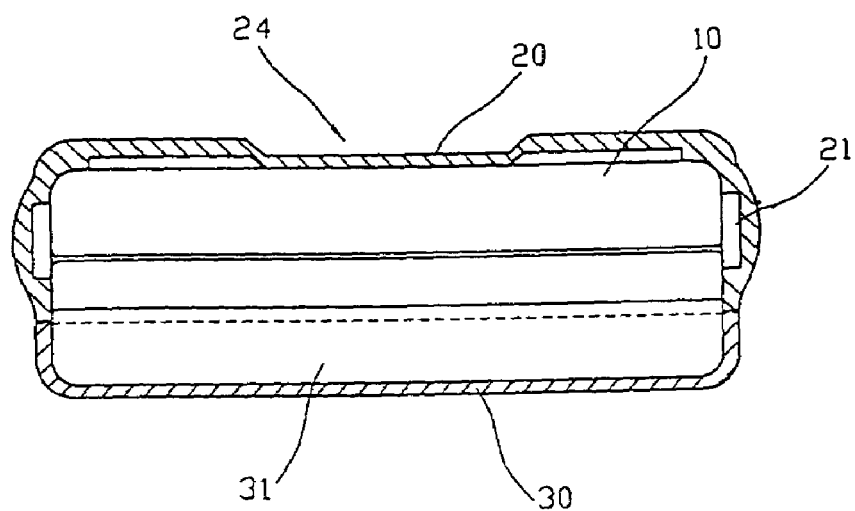
FIGS. 4 and 4A are schematic views showing that the preferred embodiment is flipped over to hold the main unit of the palm-size game in position for play.
Figure 4:
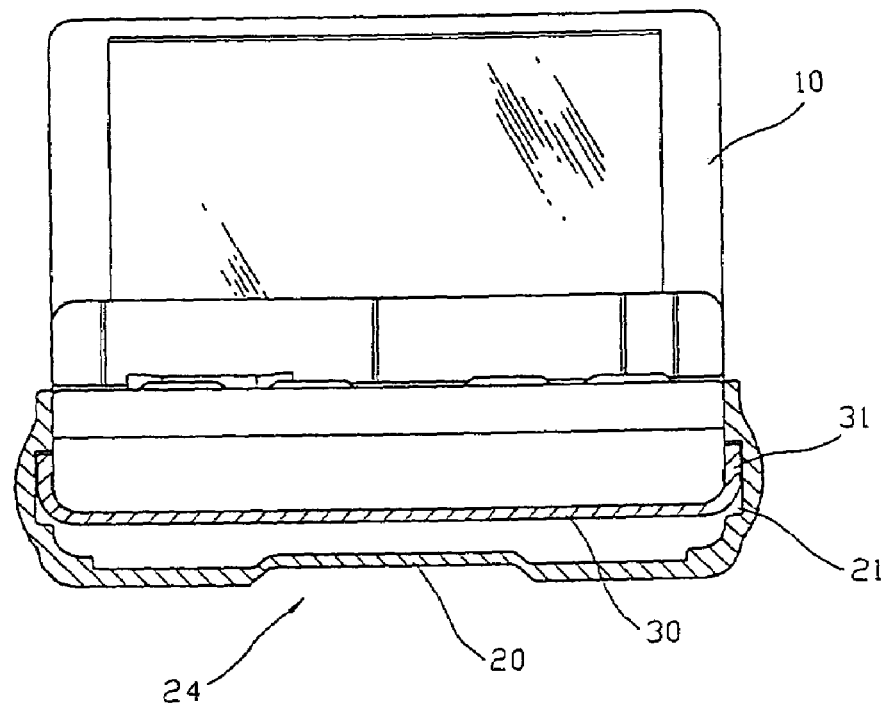
Figure 5:
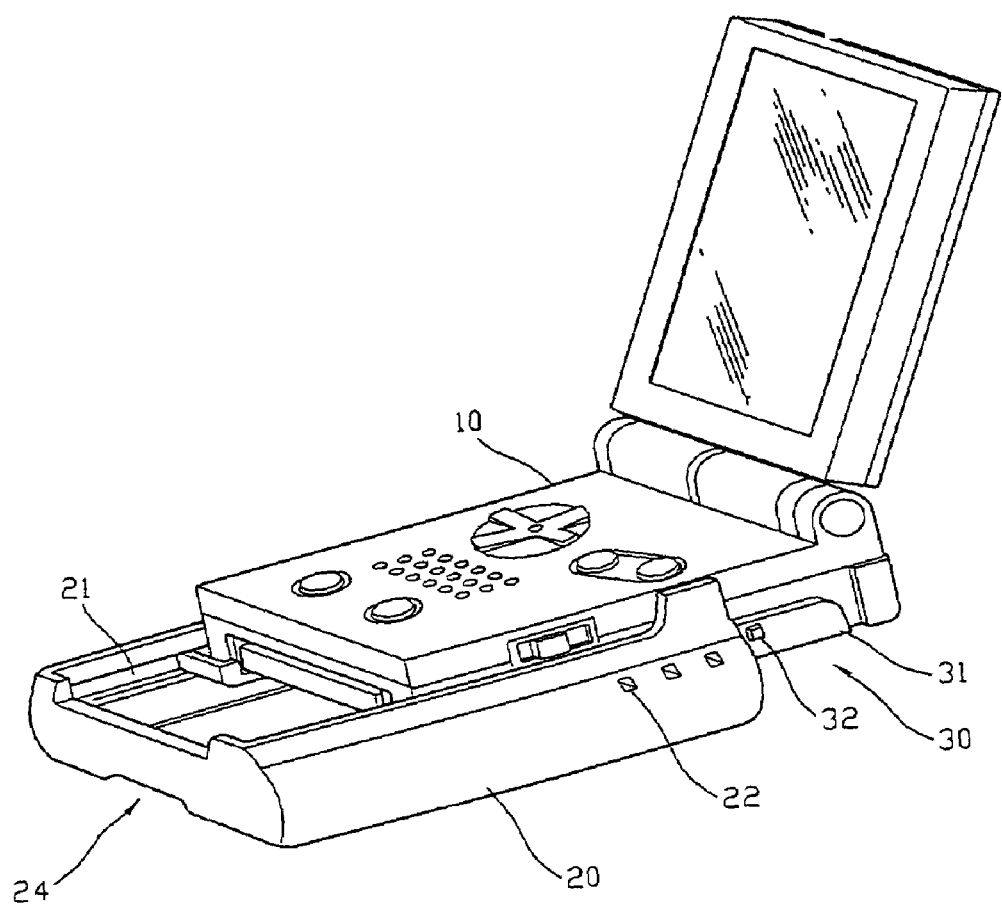
FIG. 5 is a perspective view showing that the preferred embodiment is flipped over to hold the main unit of the palm-size game in position for play.

Now referring to FIGS. 4 and 4A for a flip over operation of the upper lid 10 of the present invention. Wherein, the upper lid 20 is opened up, removed and flipped over to its right or left 180 degrees and placed below the lower lid 30. The upper lid 20 with its side tracks 21 are inserted into the their respective rails 31 provided on both sides of the lower lid 30 to define a drawer type of storage tray which accommodates the game cartridge. By engaging the locking catch 32 provided on the rail of the lower lid 30 to the selected locking holes 22 reserved on the track of the upper lid 20, both the upper and lower lids 20, 30 and the main unit 10 define a retractable trapezoid handle that is easy and comfortable for the palm to hold while playing the game. The present invention is simple in construction, easy to operate without consuming too much space as illustrated in FIG. 5.

Figure 6:
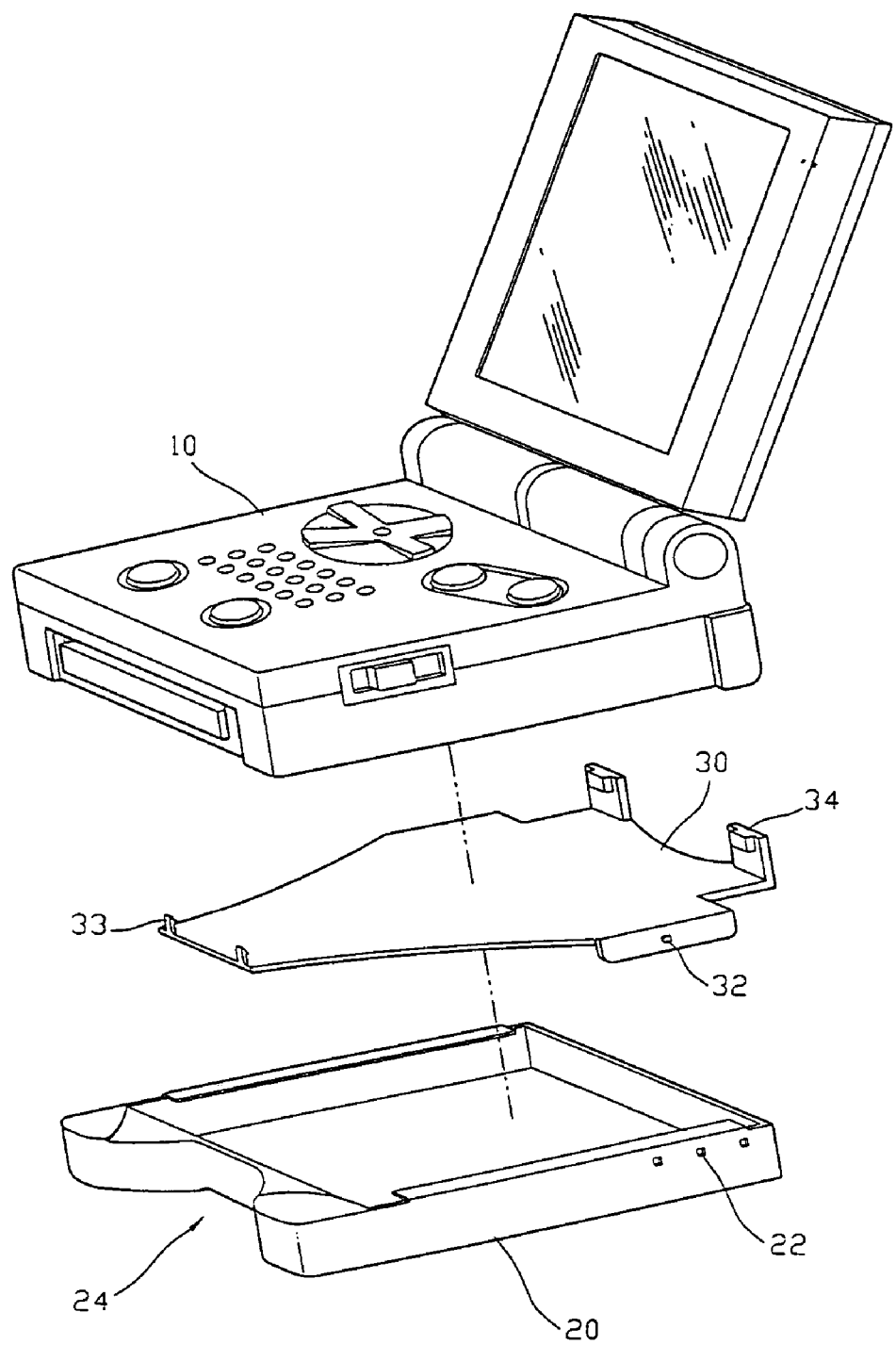
FIG. 6 is an exploded view of another preferred embodiment of the present invention.
Figure 7:
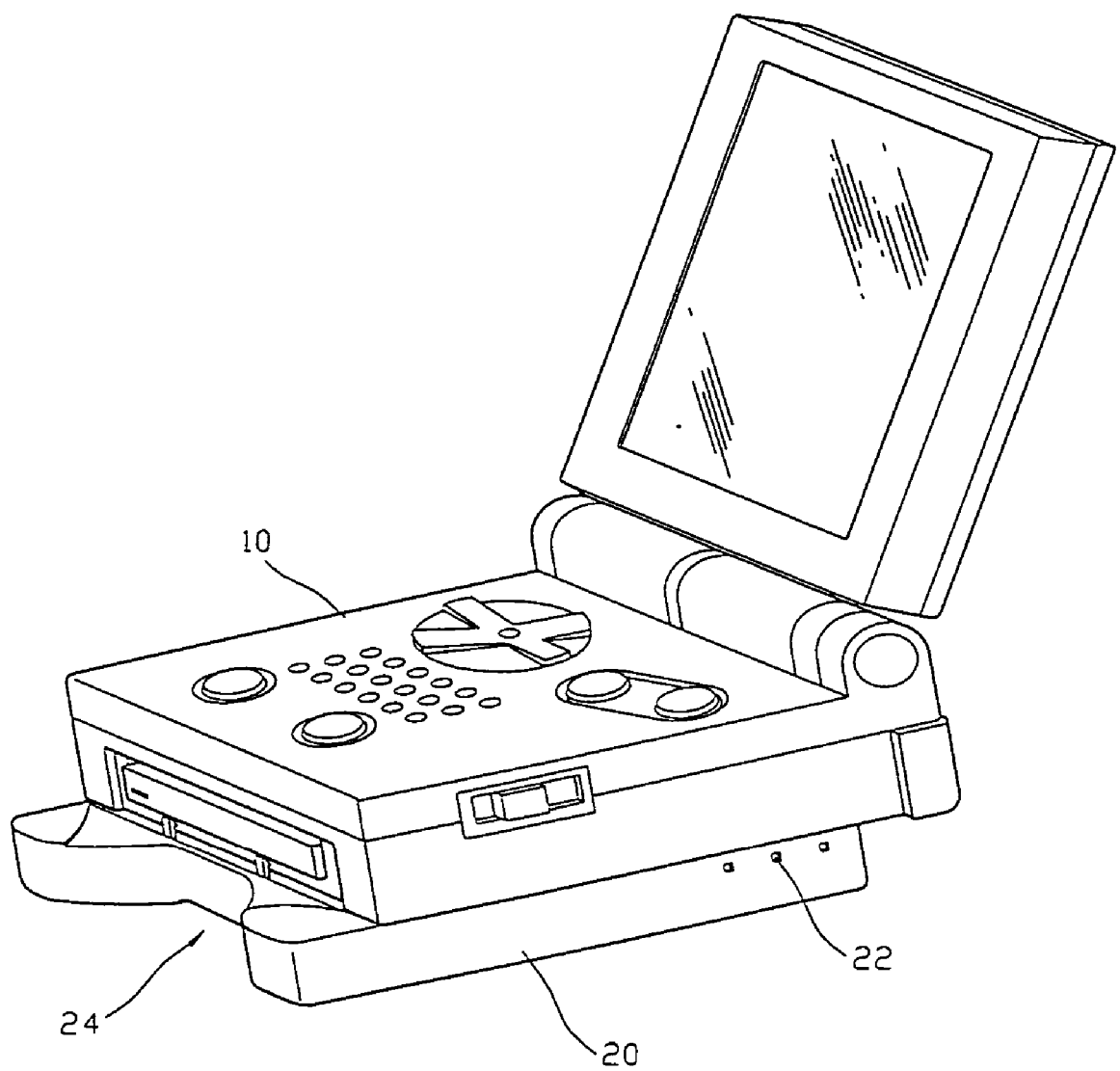
FIG. 7 is a perspective view showing that a handle is provided in another preferred embodiment of the present invention.
Figure 8:
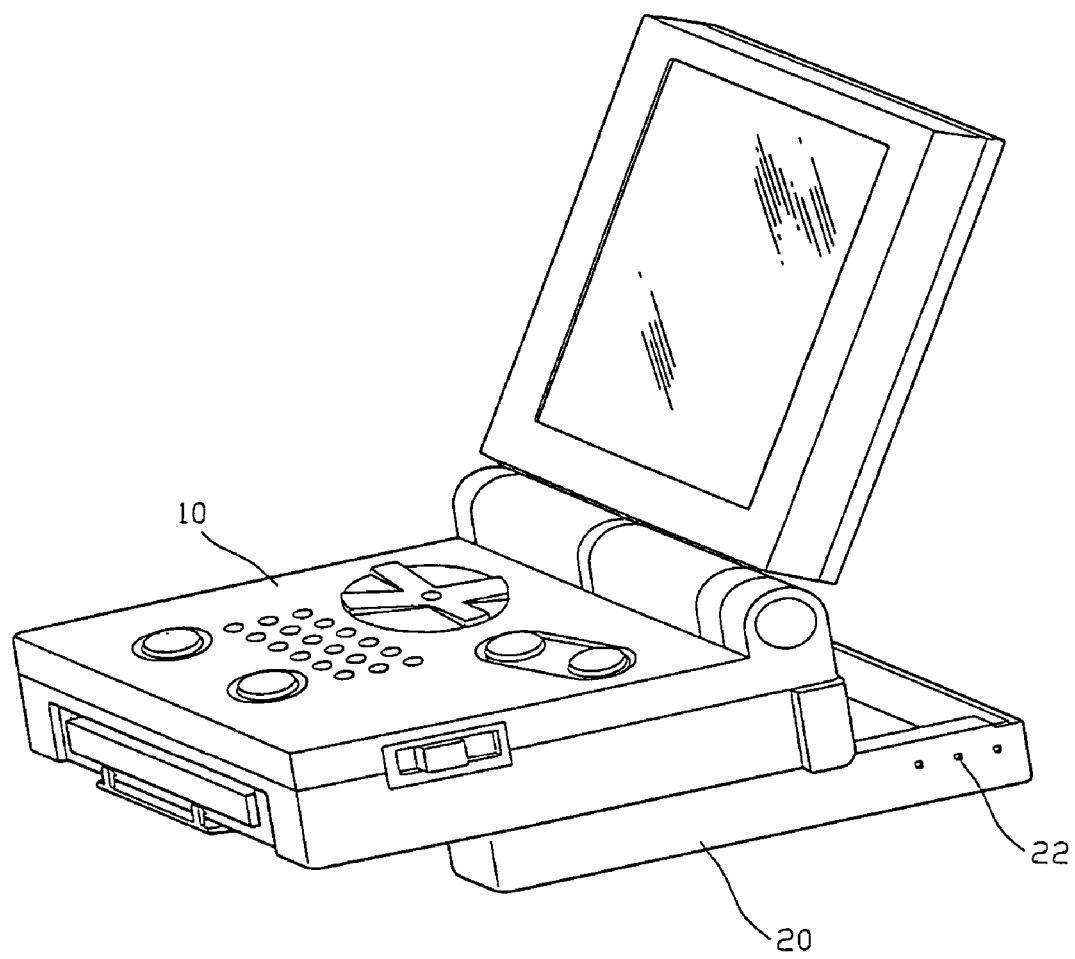
FIG. 8 is a perspective view showing a drawer adapted to the card storage of the main unit of the palm-size game.

In another preferred embodiment of the present invention as illustrated in FIG. 6, those buckling holes 11, 12 are reserved respectively in the front and the rear end of the main unit 10 of the game, and those locking catches 33, 34 are respectively reserved on the front and the rear of the lower lid 30 for the lower lid 30 to be secured to the main unit 10. At both ends of the front edge of the lower lid 30 is made in arc and a linear part is formed at the rear end of the lower lid 30 to be engaged to the track provided at the upper lid 20. The locking catch 32 is provided in the rear on both sides of the lower lid 30 and a tray is formed on the upper lid 20 to accommodate the game cartridge. A handle 24 is formed at the front edge of the upper lid 20 and multiple locking holes 22 are provided on both sides of the upper lid 20 and a track is formed on both inner sides of the upper lid 20 to be engaged to its respective rail provided on the lower lid 30 to define a retractable drawer as illustrated in FIG. 7 showing the operation of the present invention adapted to the main unit 10. With the upper lid 20 pushed to the other end, the storage tray is available as illustrated in FIG. 8.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A palm-size game case comprising: an upper lid and a lower lid with a main unit of a game sandwiched in between; two buckling holes being respectively provided on both sides in a front and a rear ends of the main unit; two locking catches being provided on both sides on a front and a rear ends of the lower lid to engage with the buckling holes on the main unit; a rail being provided on both sides of the lower lid and a corresponding track being provided on both sides of the upper lid; the upper lid being engaged to a position below the lower lid by sliding the track into the rail; and the lower lid being retractable from the upper lid to define a handle for holding the main unit.

2. The palm-size game case as claimed in claim 1, wherein, the upper lid inserted under the lower lid by sliding the track into the rail defines a drawer type of storage tray to accommodate game cartridge or other accessories.

3. The palm-size game case as claimed in claim 1, wherein, the upper lid is locked to a top of the main unit and the lower lid is locked to a base of the main unit by engaging the locking catches to the buckling holes provided on the main unit to form a case containing and protecting the main unit of the palm-size game.

* * * * *